United States Patent

Troxel

[11] Patent Number: 5,124,803
[45] Date of Patent: Jun. 23, 1992

[54] METHOD AND APPARATUS FOR GENERATING DIGITAL, ANGLED HALFTONE SCREENS USING PIXEL CANDIDATE LISTS AND SCREEN ANGLE CORRECTION TO PREVENT MOIRE PATTERNS

[75] Inventor: Donald E. Troxel, Belmont, Mass.

[73] Assignee: ECRM, Tewksbury, Mass.

[21] Appl. No.: 660,691

[22] Filed: Feb. 25, 1991

[51] Int. Cl.⁵ .............................................. H04N 1/40
[52] U.S. Cl. ................... 358/298; 358/456; 358/459
[58] Field of Search ............... 358/298, 454, 456, 459

[56] References Cited

U.S. PATENT DOCUMENTS

| | | | |
|---|---|---|---|
| 4,115,816 | 9/1978 | Moe et al. | 358/459 |
| 4,149,183 | 4/1979 | Pellar et al. | 358/459 X |
| 4,185,304 | 1/1980 | Holladay | 358/459 X |
| 4,498,108 | 2/1985 | Lindemann et al. | 358/298 X |
| 4,566,042 | 1/1986 | Cahill | 358/298 X |
| 4,809,063 | 2/1989 | Moriguch et al. | 358/298 X |
| 4,924,301 | 5/1990 | Sunbrook | 358/456 X |
| 4,926,267 | 5/1990 | Shu et al. | 358/456 X |

Primary Examiner—Benjamin R. Fuller
Assistant Examiner—Eric Frahm
Attorney, Agent, or Firm—Hale and Dorr

[57] ABSTRACT

In digital halftone color printing, low spatial frequency patterning can occur due to the interaction of the overlapping angled halftone screens. The moire patterning can be minimized by automatically constructing digital haltone angled screens from screen tiles which are designed to minimize the low spatial frequency patterning. The screen tile boundaries are generated in response to selected integers which, together with the number of screen dots along a side of the tile in the direction of screen pitch measurement, determine the a limit on the magnitude of screen angle error. Based upon these values, each pixel within the tile boundary is associated with one of the screen dots of the image. Typically, the pixels are added to potential candidate lists from which they can be selected for inclusion within a particular screen dot.

18 Claims, 7 Drawing Sheets

METHOD AND APPARATUS FOR GENERATING DIGITAL, ANGLED HALFTONE SCREENS USING PIXEL CANDIDATE LISTS AND SCREEN ANGLE CORRECTION TO PREVENT MOIRE PATTERNS

BACKGROUND OF THE INVENTION

The invention relates generally to a method and apparatus for generating halftone reproductions, and in particular, to a method and apparatus for generating digital angled halftone screens for reducing moire effects in multicolor halftone reproduction.

Digital halftoning generally refers to a non-continuous (or digital) printing process for creating the illusion of continuous tone images from an arrangement binary picture elements (pixels). In its most rudimentary form, halftoning includes optically scanning, point to point, an original image whereby an electrical signal indicative of the reflected light from the original is derived and then compared with a fixed threshold signal level. Typically, if the scanned sample is less than the threshold value, a black pixel is recorded at a corresponding point on an exposure medium. However, if the reflected light from the scanned pixel is greater than the threshold value a white pixel is recorded at the corresponding point. This process is repeated until the original has been completely scanned. While a fixed threshold preserves much of the detail of the scanned image, variations of grey which fluctuate entirely above or below a selected fixed threshold are obliterated.

The threshold signal is frequently referred to as a screen signal. The term "screen signal" derives from conventional photographic halftoning where gray levels are achieved by projecting the image of an original onto a sheet of high contrast lithographic film through an out-of-focus screen. As with a screen in the photographic process, the threshold signal of a digital system is effectively superimposed onto the continuous tone original.

In order to digitally simulate the visual effect achieved through traditional photographic halftoning techniques, prior art systems vary the screen signal level. Varying the screen signal, sometimes referred to as spatial dithering, redistributes fixed quantization error in such a way as to render it less visible. The screen signal may be varied randomly or in an ordered fashion. Many well known algorithms exist for generating screen signals. These algorithms may be divided into two categories: clustered-dot ordered dither and dispersed-dot ordered dither.

A "dot", for purposes of digital halftone, is a small area in an output medium containing a group of pixels. Since the human eye performs spatial integration when viewing objects from a distance, a gray level can be simulated by causing a subset of pixels contained in a plurality of dots to be "on" (where "on" denotes a black pixel) and "off" (which denotes a white pixel). Moreover, differing gray levels can be achieved by varying the ratio of "on" pixels to "off" pixels. For example, an illusion of middle gray may be created by causing one half of the pixels in a group of dots to be "on". The object of clustered-dot techniques is to group "on" pixels together, and the object of dispersed-dot techniques is to disperse "on" pixels as homogeneously as possible throughout the dot.

It is well known to those practiced in the art of halftone reproduction that screen signals may be stored in digital memory as threshold arrays. Typically, each element in the threshold array represents a dither threshold value and is mapped through a Cartesian coordinate system to pixel locations on the continuous tone original and on the output medium. A "screen dot" is generally defined as comprising a group of elements of a threshold array containing the screen signal information corresponding to the group of pixels contained in a particular dot on the output medium. Ordered dither algorithms generate binary halftone images by comparing reflected light from pixels of an original continuous tone image to corresponding threshold values stored as elements in the threshold array.

It would require a very large memory to store the threshold array for a screen large enough to be superimposed on an entire original image. Therefore, it is not uncommon for screen signals to be designed as periodic functions. If the screen signal is repetitive, then only one period of the threshold array need be stored. The single repetition of the screen signal stored in a threshold array is sometimes referred to as a screen "tile", "brick" or "square". Threshold values stored in this fashion are usually mapped to pixel locations on the continuous tone original through a Cartesian coordinate system, modulo the dimensions of the repeating array.

Generally, the screen tile must contain at least as many elements as the smallest screen dot. Since the number of gray levels which can be represented increases with the size of the repeating area, some prior art systems utilize larger tiles containing a plurality of screen dots. However, if a screen tile is made excessively large unwanted lower spatial frequency components may be introduced.

It is well known that images resulting from conventional photographic halftoning of monochromatic originals "look better" if the screen is oriented at a 45 degree angle. This follows from a lack of symmetry in the frequency response of the human visual system. Sharp cusps occur at the horizontal and vertical orientations. Therefore, it is common practice in digital halftoning of monochromatic images to rotate the threshold array or screen 45 degrees from the horizontal. In the case where only one period of the screen signal is stored, the rotation is generally accomplished by rotating a single tile through 45 degrees and then taking into consideration the angle of rotation when mapping subsequent tiles to pixel locations on the output medium. Low spatial frequency patterning is typically introduced by traditional methods of creating and combining tiles.

Digital halftoning techniques are commonly applied to color reproduction. Typically, a continuous tone color original is optoelectronically sampled pixel by pixel much in the same way as a monochromatic original. Three primary color signals are obtained for each pixel from which color separation signals magenta, cyan, yellow, and black (key) are derived. The sampled color separation signals are then individually compared to screen threshold values stored in corresponding threshold arrays. As in the monochromatic example, if a color separation signal is greater than the corresponding threshold value, an "on" pixel is recorded for that color separation, otherwise an "off" pixel is recorded.

Whenever two periodic structures of nearly the same period are superimposed, a moire pattern results. Such patterns occur in halftone color reproduction due to the interaction of the dot arrangements comprising the component colors. It is generally accepted that moire patterns are minimized through judiciously selecting the dot shapes and the angles of rotation for the halftone screens for each color separation. As noted above, a 45 degree rotation from horizontal is typically selected for black. Angles of 15 and 75 degrees are generally used for the cyan and magenta separations respectively. Angles of zero, 30 and 60 degrees have been used for the yellow separation. It is well known to those skilled in the art of halftone reproduction that any inaccuracies in the screen angles substantially increase the observable moire patterning.

It is impossible to produce error free exact angled screens for angles of 15 and 75 degrees on a discrete raster recorder. This is a consequence of the tangents of both angles being irrational. However, it is well known that such errors can be rendered insignificant by creating a threshold array with an arbitrarily large number of elements. Nevertheless, enthusiasm for exactness is restrained by the increased cost associated with digital memories large enough to store the requisite threshold arrays. Threshold array size is also limited by the complexity of manually assigning pixels to each screen dot in addition to combining the screen dots to form the requisite screen tiles.

It is therefore an object of the present invention to provide an automated method for constructing screen dots so that threshold arrays containing large numbers of pixels can be used to more closely approximate ideal color separation screen angles.

It is a further object of the invention to assign pixels to screen dots to minimize moire patterning resulting from interaction of the dot arrangements comprising each of the color components.

It is also an object of the invention to provide an automated method for creating rotated screen tiles to minimize low spatial frequency patterning.

SUMMARY OF THE INVENTION

The invention relates to a method for automatically generating a digital, angled halftone screen at an angle to a Cartesian coordinate system used for scanning and recording. The screen is composed of a plurality of repetitive screen tiles which fit together to "tile the plane". This screen has a predetermined screen pitch "p" and screen angle "s", and each tile contains a predetermined integer number, "N", of screen dots along a side of the tile in the direction of screen pitch measurement. In a preferred embodiment of the invention, there are "N" screen dots along each side of the tile.

The method features the steps of selecting integer values for "a", "b", and "N" for providing a screen angle error, equal to the magnitude of (arctan (a/b)−s), which is less than a selected threshold and which further yields a desired screen pitch. The method further features automatically generating a screen tile boundary configuration in response to the values of "a" and "b", automatically assigning each pixel within the tile boundary to be associated with a selected one of the screen dots, generating threshold data, in response to the assigning step, representing a screen signal threshold value for each pixel of the tile, and generating the angled halftone digital screen using the threshold data in the Cartesian coordinate system.

In an illustrated embodiment, a mapping array can track to which screen dot each pixel is assigned and a threshold array tracks the threshold data value assigned to each pixel. Every element in the mapping array corresponds uniquely to an element in the threshold array and is mapped to a particular pixel in the screen tile being generated.

Each pixel contained in the screen tile is assigned to one of the screen dots which comprise the screen tile. Pixels are assigned to screen dots by choosing the highest priority (best mathematical fit) pixel, for example, from a candidate list. A prioritized candidate list is maintained for each screen dot. A pixel is initially assigned a priority based on how well it fits the particular dot model being employed and how few new exposed pixel edges would result from selection of that pixel for inclusion in the screen dot being constructed.

The candidate list can be further prioritized based on further criteria, for example, the proximity of a candidate pixel to the most recently chosen pixel. Priorities are assigned in descending order with pixels closest to the most recently chosen pixel being assigned the highest priorities.

The candidate list can also be subsequently prioritized using as a criterion how well the candidate pixel aids in aligning the screen dot being constructed with previously constructed neighboring screen dots, given the predetermined screen ruling and screen angle.

Following assignment, the particular screen dot identifier is stored in the mapping array at a location corresponding to the chosen pixel. Additionally, the selected pixel is marked on the candidate list as being used. Moreover, the pixels vertically and horizontally adjacent to the chosen pixel are added to the candidate list, and the candidate list is reprioritized by adding the pixels to bubble up from the bottom of the list. The pixel selection process is repeated until every pixel contained in the screen tile is assigned to a screen dot.

Each pixel assigned to a screen dot is also assigned an ordinal number corresponding to a screen signal dither threshold level. In the illustrated embodiment, the system stores a particular ordinal number in the threshold array location corresponding to the pixel being assigned in the order the pixels are assigned. The dither threshold value assigned may be based on the order in which the pixel was assigned to a particular screen; each succeeding pixel being assigned a correspondingly higher dither threshold value.

The inventive method thus results in a halftone screen tile represented through a mapping array and a dither threshold array.

BRIEF DESCRIPTION OF THE DRAWINGS

Other objects, features, and advantages of the invention will be apparent from the following description, taken together with the drawings, in which:

FIG. 9b is an example of a threshold array generated by the present invention and corresponding to the mapping array shown in FIG. 9a;

FIG. 10b is the threshold array generated in accordance with the preferred embodiment of the invention for the mapping array of FIG. 10a.

DETAILED DESCRIPTION OF PREFERRED EMBODIMENTS

The present invention is directed to a method and apparatus for creating digital angled halftone screens. The digital angled halftone screens are created by a system employing a Cartesian coordinate system so that the scanning and the recording lines are typically not aligned with the desired angle of the resulting screen. Accordingly, the system employs memory storage for either creating the entire screen prior to playback or for enabling the proper "on the fly" reconstruction to take place during playback.

As noted above, each halftone screen dot in a digital screen (for example a dot 8 in FIG. 4,) is comprised of a group of individual picture elements ("pixels") 9 (FIG. 4), the number of pixels used to create the screen dot depending upon both the resolution of the scanning and recording mechanism, and the desired screen dot resolution or screen pitch. Further, as has been noted above, the accuracy with which the angle of the screen matches the desired angle can be important for reducing various artifacts, and in particular moire patterning when two or more angled screens overlap. However, the tangent of the commonly used angles, for example, 15° and 30°, are irrational and hence can only be approximated using a digital Cartesian coordinate system. Nevertheless, by using a relatively large number of rows and/or columns to approximate the tangent of the angle (the tangent being equal to the number of rows divided by the number of columns, for example 3/11 for the tile in FIG. 4), a sufficiently accurate representation can be achieved. However, in such circumstances, it becomes difficult, as the tile grows in size, to manually create the necessary information to accurately model a so-called "digital halftone screen tile" (a collection of pixels) which can then be used to "tile the plane". (Tiling the plane consists of using a selected screen tile (having associated therewith a designated angle and boundary) and repeating it periodically, along both axes of the Cartesian coordinate system, so that the tiles fit together to completely cover all of the pixel elements of the screen.) The present invention is directed to automatically modeling such a tile thereby enabling, for the first time, a complex and substantially artifact-free tiling of the plane.

Figure 1:
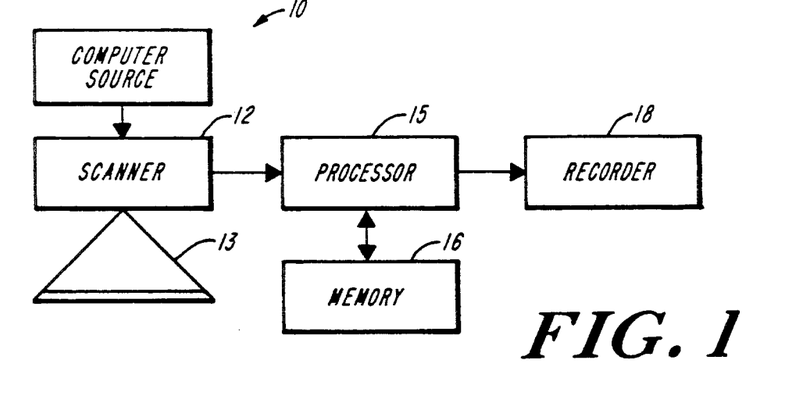
FIG. 1 is a block diagram of an apparatus for carrying out the invention.

Referring to FIG. 1, in a typical scanning and recording system 10, a scanner 12 scans, in the horizontal "x" direction, a film or hard-copy original 13, or provides an original from a computer generated source 14, and delivers the value of the resulting pixels, in the Cartesian coordinate system, to a processor 15. The scanner, for example, can have a horizontal resolution of 2540 pixels per inch. The scanner can yield full color reproduction so that there can be stored, by a processor 15 having in a memory 16, three (or more) complete color images representing the original document. The processor can also read, in memory 16, a stored screen signal, that is, a signal which it uses to process the incoming picture element data for output on the recorder 18 as a halftone image.

Figure 2:
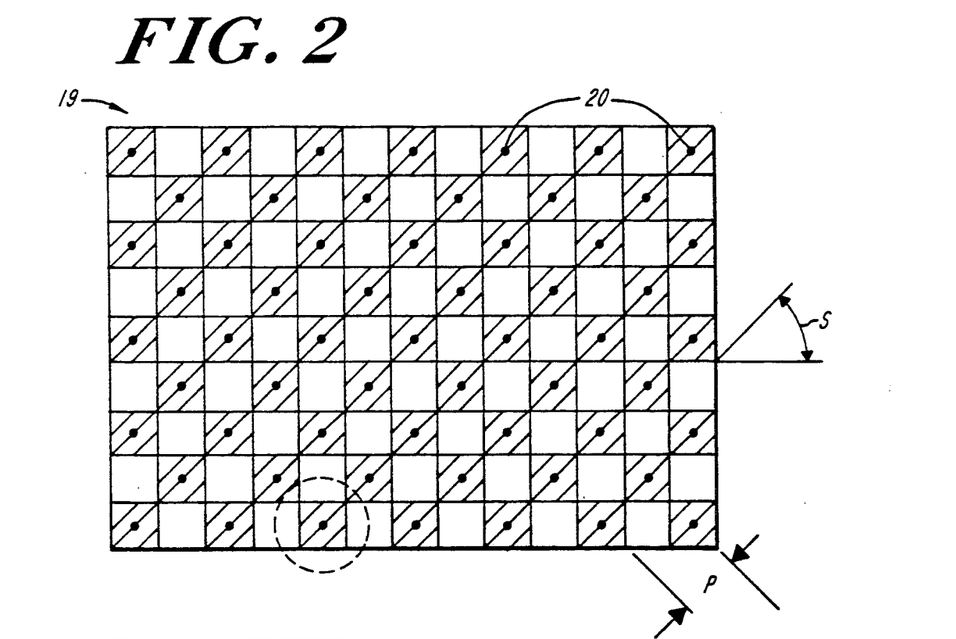
FIG. 2 is a diagrammatic representation, illustrating an expanded view of the screen and pixel structures for a 45° digital screen.
Figure 3:
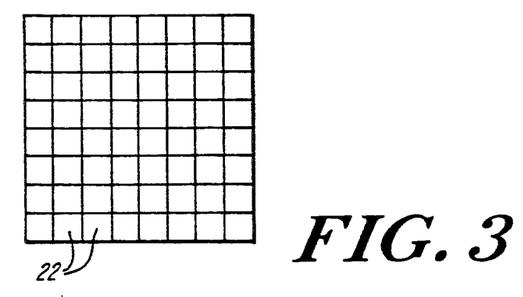
FIG. 3 is an expanded view of the circled portion of FIG. 2.

Referring to FIGS. 2 and 3, a portion of, for example, a 45° screen 19, has a plurality of screen dots 20 (represented diagrammatically by the shaded areas) which occur along a 45° axis at a desired screen pitch. Each screen dot 20 is made up of a plurality of pixels 22, each screen dot and each pixel being assumed, for convenience, to be square in shape, and each pixel being the repetition element which a rectilinear writing or reading system lays down or reads one row at a time. Accordingly, the writing direction is not coincident with the angle of the screen and processor 14 operates to generate the correct signals as a line of pixels is being written. The end result, however, is a screen which appears to have been written at the correct desired "angle".

In accordance with the invention, a screen tile 112 (FIG. 4) is the basic screen unit and can include one or more screen dots 20. In accordance with a preferred embodiment of the invention, there are $N^2$ screen dots associated with a tile, there being N screen dots along a side of the tile. The screen dots need not have a simple (for example, square) shape. Thus, all tiles in accordance with the illustrated embodiment of the invention have a generally rhombic shape. Other shapes could also be used.

Figure 9A:
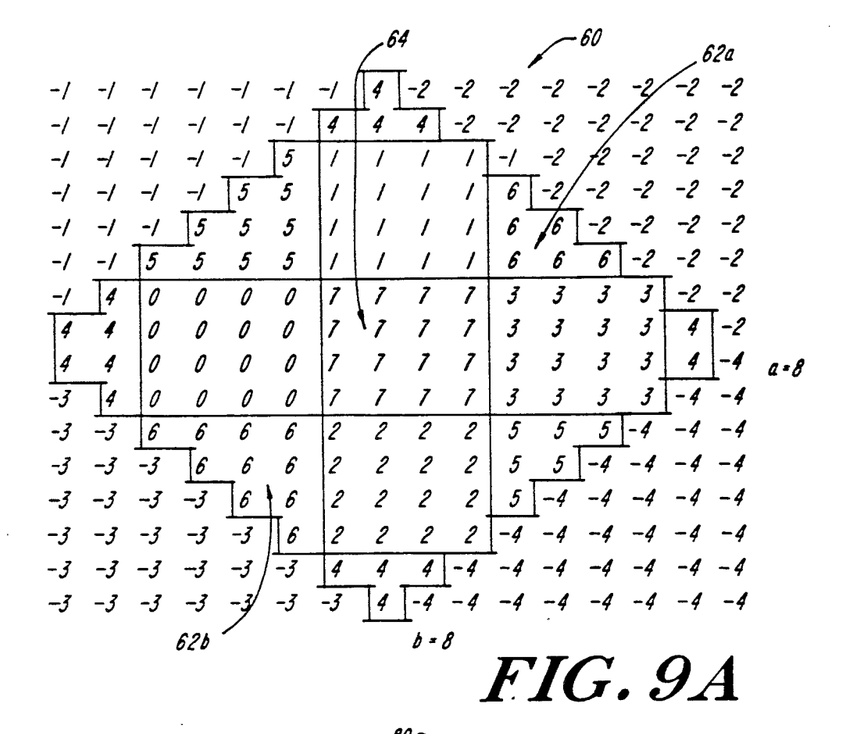
FIG. 9a is an example of a mapping array of the type generated by the present invention for a screen tile containing four screen dots (eight 50 percent dots) and approximating a 45 degree screen angle.

The present invention provides an automated method and apparatus for generating the angled digital halftone screen tiles. Each halftone screen tile contains a predetermined number of pixels arranged in a rectilinear coordinate system and grouped to generate halftone dots in accordance with a predetermined screen pitch "p" and screen angle "s". The dots are collected, according to the invention in repeating halftone screen tiles which, in the illustrated embodiment contain a predetermined integer number of screen dots, ($N^2$ in the illustrated embodiment) the screen dots being identified for convenience by an integer label $1, 2, 3, \ldots, X(=N^2)$. A mapping array is developed for recording the assignment of pixels in the tile to the screen dots. FIG. 9a illustrates a mapping array for the 45° screen of FIG. 2 wherein each tile has two screen dots on a side.

Figure 4:
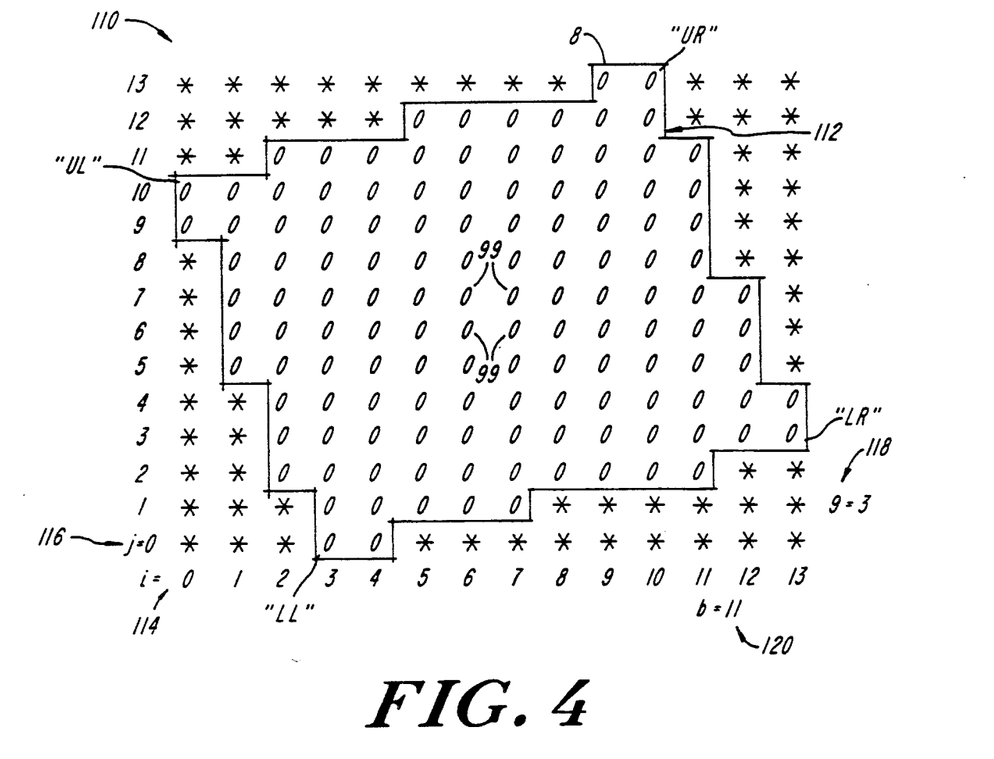
FIG. 4 is a diagrammatic view of a single dot screen tile at a screen angle equal to arctan 3/11.

Referring to FIG. 4, the mapping array 110 of the type generated by the present invention for the screen tile 8 contains one screen dot and approximates a fifteen degree screen angle (using an angle equal to arctan 3/11). The array 110 has elements $M_{ij}$ shown at 99 which are addressable through column designation i shown at 114 and row designation j shown at 116. Elements included in the screen tile are indicated by zeros. The color separation screen angle is approximated as the $\tan^{-1}(a/b)$ where "a" is shown at 118 and "b" is shown at 120.

The parameters which determine the boundary of a tile are "a" and "b", and, as noted above, arctan a/b equals the angle of the screen. The rhombic shape of the illustrated tile has sides of length "c", where $c^2 = a^2 + b^2$. There are "$c^2$" pixels in the tile. As the number of pixels ($c^2$) in a tile increases, the error in approximating a screen angle with a rational tangent typically decreases.

Referring to FIG. 4, where $a=3$ and $b=11$, the actual screen angle is 15.26 degrees and the tile contains 130 pixels (equal to $a^2+b^2$). As the values of a and b increase, however, to better approximate the desired screen angle, (for example where $a=15$ and $b=56$ yielding an angle of 14.99 degrees and a tile containing 3361 pixels), it becomes impracticable to generate halftone screen tiles by hand. Yet, to minimize moire patterns, it is critical that very close approximations (meaning, in general, large "a" and "b") of the desired color separation angles are realized. Therefore, the automated method of the present invention provides a powerful tool for designing halftone screen tiles which effectively minimize moire patterning.

The values of "a" and "b" however, cannot be set in a vacuum. As noted above, each tile includes a number of screen dots, the number of screen dots determining the screen pitch, the number of halftone screen dots per inch in the direction of the screen line. In the illustrated embodiment of the invention, there are N screen dots along each side of the illustrated tile thereby resulting in $N^2$ screen dots. The screen pitch can then be calculated as:

$$R*N/c$$

where R is the resolution of the scanning and recording system in pixels per inch and N and c are as defined above.

As an example, then, for a screen resolution of 2540 picture elements per inch, if $a=18$, $b=18$, and $N=1$ (a single dot, 45 degree tile), there results a screen pitch of 99.78 halftone screen dots per inch. When the values of "a" and "b" are both increased to 19, the screen pitch changes to 94.53 halftone screen dots per inch, and when the value of "a" and "b" is reduced to 17, the screen pitch changes to 105.65 halftone screen dots per inch. All of these calculations assume that $N=1$. Suppose, however, that a value of "a" and "b" equal to 17.5 was needed. Clearly, one cannot provide, with an integer numbers of pixels, $17\frac{1}{2}$ pixels to define a side of a tile. However, by choosing the value of "a" and "b" equal to 35, and allowing $N=2$, one can effectively create a four screen dot tile having an effective value of "a" and "b"$=17.5$ thereby yielding 102.6 dots per inch. In this manner, by properly selecting the values of "a", "b", and "N", one can become arbitrarily close to both the desired screen angle and the desired screen pitch. The penalty is a value of "a", "b", and "N" which is likely to be quite large and thereby provides a substantially impossible task when the creation of the tile is preformed by hand. As noted above, the claimed invention is designed to effect the automatic generation of the tiles as described below.

The system first generates a preferred boundary for the tile. As noted above, in the illustrated embodiment, the boundary is a rhombic shape (a rotated square of picture elements) and the tiles can be replicated and fit together much as one might fit together hexagonal tiles for a floor.

Defining the Boundary of the Tile (Rotated Square)

Figure 5:
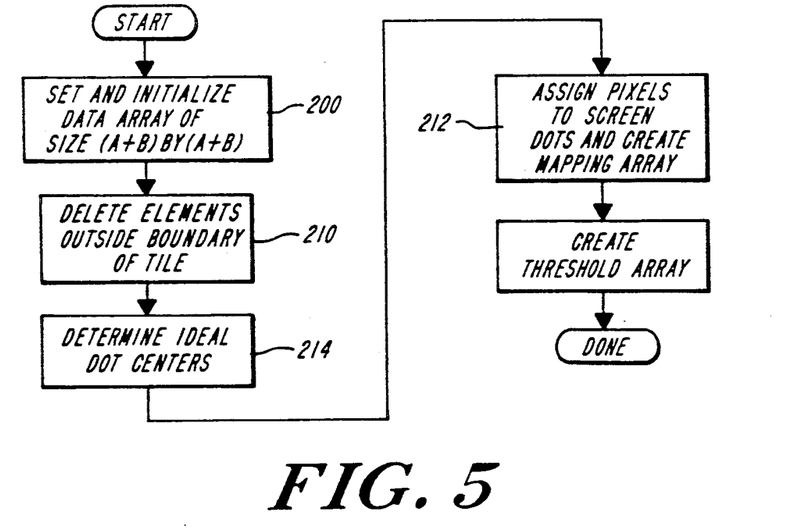
FIG. 5 is a flow chart of the overall operation method of the apparatus in accordance with the preferred embodiment of the invention.

The boundary of the tile is specified by the two parameters, "a" and "b". Referring to FIGS. 4 and 5, a data array of size "a+b" by "a+b" is created at 200 in memory and initialized to zero. A method, at 210, corresponding to minimizing the least square error for drawing a slanted line (the line having a slope of either "a/b" or "b/a" depending upon the starting point) on a discrete matrix is used to determine which cells of the matrix, and therefore which array elements, lie outside the desired rotated square. As an aid to one method of "tiling the plane", the four exterior line portions of the tile, the rotated square, are marked UL, UR, LL and LR, respectively as illustrated in FIG. 4. Then, to ensure that the rotated squares mesh with themselves, the boundary for the lower right LR is correlated with that of the upper left UL so that consistent decisions are made in the event that the error measure used in the method precisely equals 0.5. As illustrated in FIG. 4, the tile comprises $c^2 = a^2 + b^2$ pixels and the side boundaries are correlated to enable a tiling of the plane.

Once the boundary of the tile has been determined, the inventive method assigns, at 212, groups of pixels to each screen dot, in an ordered fashion to be described below, and based on a measure of "goodness." Prior to determining the assignment of pixels, the ideal centers of the dots are first determined at 214.

Defining the Dot Centers

In the illustrated embodiment, the preferred dot model has 50 percent highlight and shadow dots; and once the boundary of the tile has been determined, the exact desired coordinates for the centers of the highlight and shadow dots are calculated. (In other embodiments, different dot models are used.) This requires, instead of $N^2$ screen dots, that there be $2N^2$ fifty percent dots ($N^2$ highlight plus $N^2$ shadow) in the rotated square. All subsequent processing, namely, the actual growth of the dots (the adding of pixels to a dot group), is accomplished as if the plane were tiled with the rotated square; that is, without boundary effects. This means that the actual placement of the array of dot centers is arbitrary; that is, the horizontal and vertical position of the first dot center, which then determines all subsequent dot centers, is arbitrary. However, the "goodness" of the resulting dot shape is influenced by this "arbitrary" choice.

The present preferred embodiment postulates that a good measure of placement error, that is, selection of a pixel at the center of the dot is either the maximum error, along a coordinate axis, between actual and desired center locations, or the root-mean-square (RMS) error of the dot center placement. In the illustrated embodiment, the first ideal dot center is selected to be the upper left portion of the tile and an RMS error criterion is used for pixel selection.

Dot Growth

Figure 6:
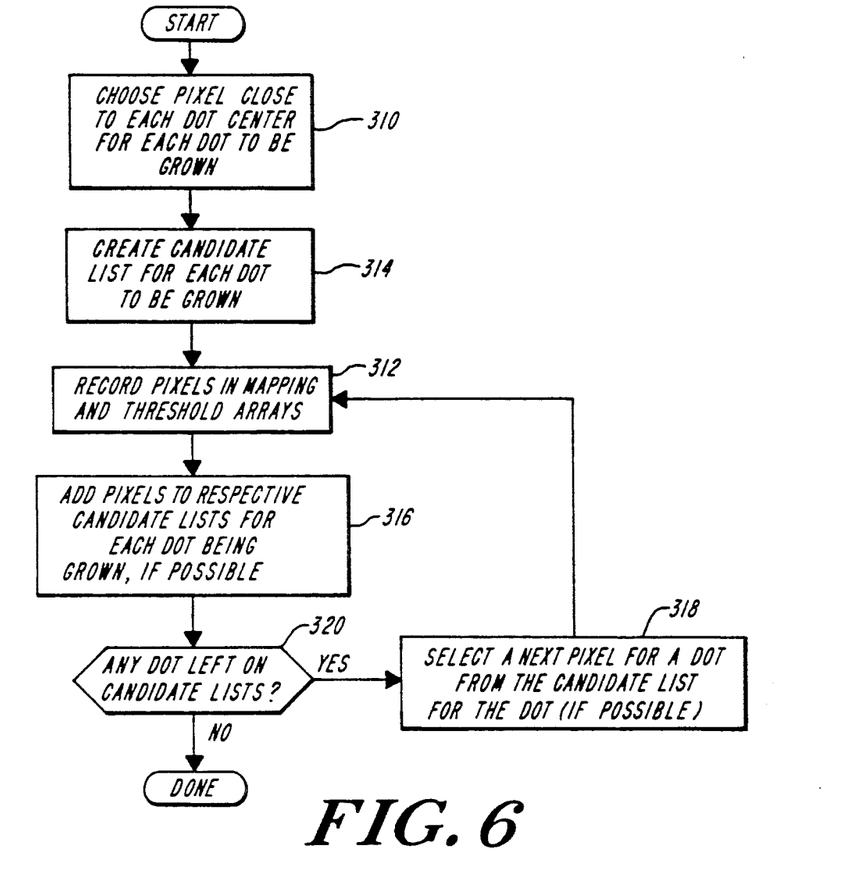
FIG. 6 is a flow chart illustrating overall operation and generation of the candidate lists and the selection of pixels therefrom.

Referring to FIG. 6, dots are grown by choosing the pixels in order. First, a single pixel close to each desired dot center of the tile is chosen at 310. Then pixels surrounding the pixels already chosen are picked in sequence according to criteria to be described below. These sequence numbers are entered at 312 (see FIG. 9b) in the threshold array matrix described above. Another matrix of the same size, the mapping array matrix, is used to record at 312 the dot number to which the chosen pixel is assigned (see FIG. 9a).

In the illustrated embodiment, where both shadow and highlight dots are grown, the highlight dot centers are first selected, and the shadow dot centers are then placed at (according to a minimum RMS error criterion) the intersections of lines connecting diagonally adjacent highlight dots. For example, in FIG. 10b, the highlight dot centers 280 are selected first, and the shadow dot centers 282 thereafter. The 50 percent dots are thus determined by the selected ideal locations of the shadow and highlight dots through the sequential selection of pixels and the simultaneous recording of the sequence numbers associating the pixels with the dots. This process continues until every pixel within the rotated square, the tile, has been assigned to a dot.

As a diagnostic, after the assignment process is completed, the areas of the 50 percent dots (that is, the highlight and shadow dots) are computed. The sum of these areas must equal c*c (the total area of the tile) and the area of each dot should be within one pixel of each other dot. The two resulting matrices (the array matrix and the mapping matrix) contain enough information to permit subsequent scaling and incorporation of any desired tone scale correction or gradation. It should be noted that each dot need not be scaled in an identical manner as every other dot. For example, when the dot area is less than the number of gray levels represented by the input continuous tone image, it is desirable to associate dots together in groups of four or nine, when calculating the tone scaled values.

The Candidate List

During the process "growing" each dot making up the tile, in the illustrated embodiment, a candidate list of those pixels eligible to be next added to the dot is created (at 314) and maintained (at 316) for each dot (or in the illustrated embodiment, each 50 percent dot) to be grown. (Other methods of selecting pixels, consistent with a selected prioritizing or ranking method, and not using a candidate list, can also be employed.) The growth process for each dot involves choosing one pixel from the candidate list (at 318) for that dot and adding it to the group of pixels belonging to the dot. The mechanism for effecting this choice is described below. In addition, adding candidates to and selecting candidates from a candidate list from each dot can either be performed in parallel or in sequence. That is, dot growth can be made without any reference to the choices made for neighboring dots or dots can be grown together, that is, the selection process addresses first one dot and then the next dot, on a pixel by pixel basis, so that all dots grow, for purposes of filling out their configurations, at the same rate (in parallel). Other, different arrangements of the order of selecting and growing the dots can also be implemented. At the present time, the parallel growth is considered the best choice.

In this illustrated embodiment, a pixel is added to the candidate list for one dot without reference to whether it has also been chosen for the list of another dot. If therefore, the pixel chosen from the candidate list for a dot has already been chosen as a result of the growth of an adjacent dot, then another pixel is chosen from the candidate list until either an acceptable choice, that is, a pixel not previously used for another dot, is found or the candidate list is exhausted as tested at 320. When a choice of a pixel on a candidate list is made, the entry in the candidate list is marked as CHOSEN. When an acceptable choice has been made, the entry in the candidate list is marked as USED, the sequence number for the next choice of pixel is incremented, the dot number is recorded in the map matrix array in the location of the used pixel, and the sequence number is recorded in the threshold matrix array in the location of the used pixel (at 312). Additionally, the north, south, east, and west neighbor pixels to the selected and used pixel are added to the candidate list for the dot at 316, if they have not been used for another dot, and are not already in the candidate list for the dot. To reduce the computation time required for the dot growth, the candidate list is maintained in an order which is sorted on decreasing model values of "goodness". (see below). This is accomplished by appending each new candidate pixel to the bottom of the list (at 510, FIG. 8) and then bubbling it up to its proper place. There results a candidate list for each screen dot which ranks pixels in the order of "goodness".

Figure 7:
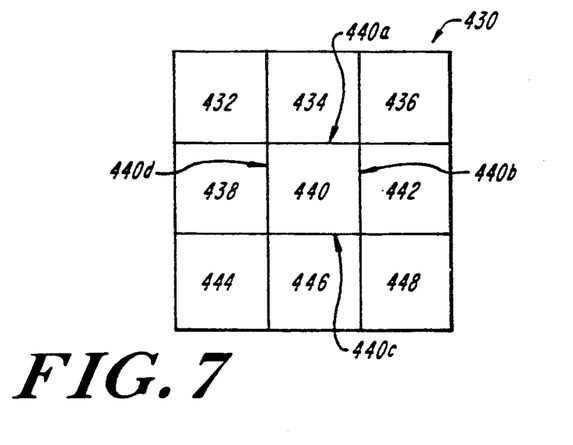
FIG. 7 shows an expanded view of nine rectangular pixels of the type represented by a mapping array.

In a preferred embodiment of the invention, using a theoretical rectangularly-shaped pixel as the model, one measure of "goodness" is the number of exposed pixel edges that results from the inclusion of a particular candidate pixel in a screen dot. Referring to FIG. 7, an expanded view of a pixel space 430 illustrates nine rectangular pixels 432 through 448 of the type represented by the mapping array of FIG. 9a. As can be seen by an example, the selection of a first pixel 440 for a dot (chosen as being closest to the ideal dot center) for inclusion in a particular screen dot pixel group results in four exposed pixel edges 440a through 440d. However, the addition of a second pixel selected from adjacent candidate pixels 434, 438, 442 or 446 results in only three additional exposed pixel edges. Therefore, with respect to the particular screen dot being constructed, pixels 434, 438, 442 and 446 enjoy a higher "goodness" or priority ranking than pixels 432, 436, 444, and 448 whose inclusion would result in four additional exposed pixels edges. It is for this reason that the north, south, east, and west dots are the ones added to the candidate list after a pixel is used. In the example of FIG. 7, if pixel 440 and pixel 434 have been chosen, pixels 432, 436, 438, 442 and 446 would then have identical priority rankings since inclusion of any of them would result in three additional exposed pixel edges.

Dot Models

It is not uncommon for candidate pixels to have identical priority rankings when those rankings are based solely on the number of exposed edges that would result from inclusion in a particular screen dot. Therefore, in preferred embodiments of the invention candidate lists are further prioritized based on how well a candidate fits into the specific dot model being employed to construct a screen dot. Two parameters define a dot model. The first parameter is the two dimensional shape formed by the set of pixels chosen for inclusion in the screen dot. As can be seen from FIGS. 9a and 9b, the dot model used in this embodiment is a combination of a shadow dot and a highlighted dot. The second parameter is the three dimensional shape which is simulated through the selection of dither threshold levels. For example, the dot model of the embodiment of FIGS. 9a and 9b simulates a cone or inverted cone shape (for the highlight and shadow dots respectively). (As noted above, in other embodiments, geometrical shapes such as double ended cones, elliptical cones and pyramids may be simulated.)

Dot models which are useful in halftone reproduction can be either mathematically or empirically based. Mathematical models can be simple or complex. Perhaps the simplest would be a cone which might produce circular highlight dots and shadow dots shaped as the intersection of four adjacent highlight dots. Alternatively, one might employ a double ended cone so as to achieve circular highlight and shadow dots. (FIGS. 9a and 9b) One also might use elliptical cones, pyramids, or a plethora of other geometrical shapes or compositions of geometrical shapes. Alternately, one can create, empirically, a dot model by storing samples which have been hand crafted with intermediate values calculated by appropriate filtering and resampling. In any event, one can implement a procedure which returns a dot model generated value for any specified pixel.

Winnowing the Candidate List

Figure 8:
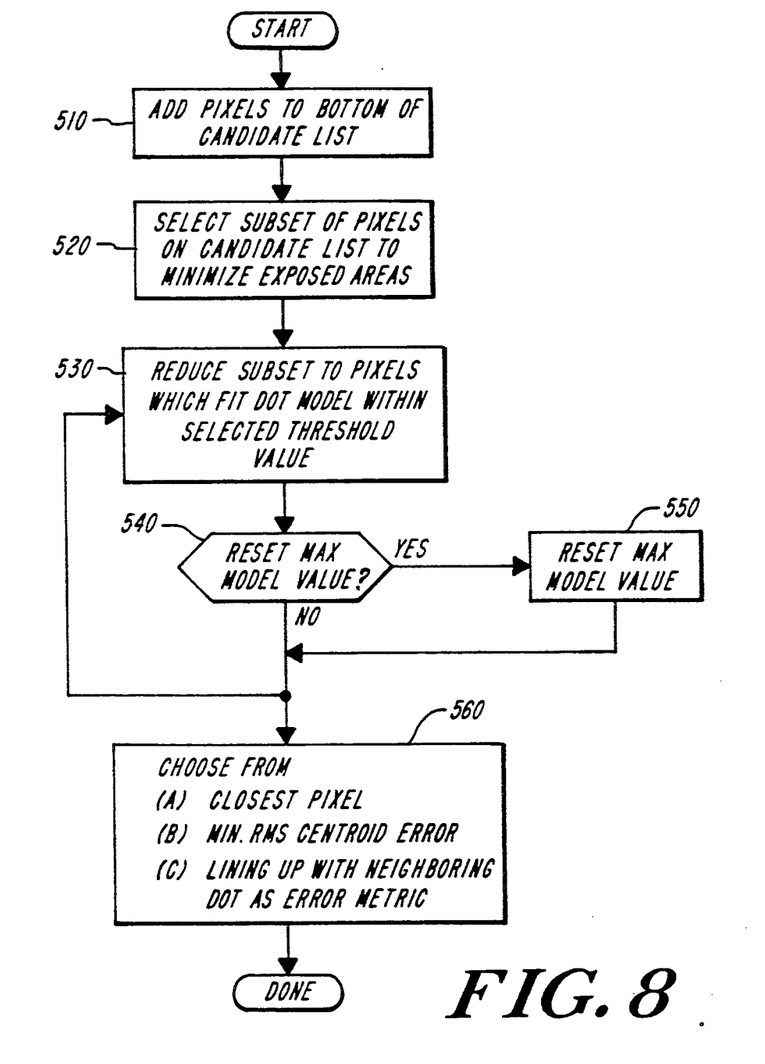
FIG. 8 is a flow chart of the method according to the invention for adding pixels to the candidate list and for selecting pixels therefrom.

Referring to FIG. 8, preferably, a pixel is chosen from the candidate list in two stages according to three measures of "goodness". In the first stage, the set of all possible pixel choices on the candidate list is winnowed to a subset at 520, 530 by keeping the candidates that best fit the model within a selected threshold range, while minimizing the number of exposed edges as described above, if this test candidate were to be chosen. The model value must be within a selectable threshold of the maximum model value for all non-chosen candidates in the list.

As noted above, the exposed edge criterion is determined by asking the question, "How many exposed edges will result for this pixel if this candidate is chosen". The very first pixel chosen results in four exposed edges. The second pixel chosen must result in three exposed edges as it must be a north, south, east, or west neighbor of the first pixel chosen. Eventually, there will be a pixel which results in only two exposed edges. This pixel is preferred over others that are within the model tolerance threshold but which result in, for example, three exposed edges. In fact, in the preferred embodiment of the invention, every time a candidate resulting in a lower number of exposed edges is encountered, (determined at 540), the "maximum" model value is reset, at 550, to its model value and all other candidates whose model value is close to this pixel are considered.

Choosing from the Winnowed Candidate List

Even with a zero tolerance on the model value, the above two criteria are not necessarily sufficient to narrow the choice to a single pixel on the list. Accordingly, several additional selection mechanisms (at 560) can be used to make the choice. Unfortunately, no one mechanism produces the best results in all cases; however, two mechanisms appear to give satisfactory results for most cases.

When $N=1$, (corresponding to one dot per tile, FIG. 4), a good metric for choosing pixels from the winnowed candidate list is to simply choose that pixel which is closest, (in center to center distance) to the last one chosen.

Choosing the candidate pixel which minimizes the RMS error of the resulting centroid of the dot, with the ideal desired centroid works well when N is not too large. When N is large, this can result, for some cases, in some patterning within the rotated square.

Another error measure that works well is to determine how well the resulting dot lines up with its neighboring dots. Consider, for the sake of an example, that the dots are to be in horizontal rows and vertical columns. The vertical component of the centroid error is calculated for all dots in the horizontal row for the dot under consideration. Then a filtered or weighted sum of these errors is calculated. The same calculation is then performed for the horizontal component of the dots in the vertical column. Then the sum of the squares of these two error components is calculated and the candidate resulting in the least error is chosen.

Referring to FIG. 9a, is a more complex example where $a=8$, $b=8$, and $N=2$, a mapping array for a screen tile contains four screen dots (comprised of eight 50 percent shadow and highlight dots) and approximates a 45 degree screen angle. Pixel assignment to a particular screen dot group 64 is indicated by assigning to each pixel of the tile an integer label, 0 through 7 in the illustrated embodiment, corresponding to the 50 percent screen dot to which it is assigned. (In the illustrated embodiment the eight 50 percent screen dots correspond to four highlight dots and four shadow dots.) In some instances, such as shown at 62a and 62b, a dot is divided within the tile, however, as described above, when the plane is tiled, the full 50 percent screen dot is formed (from two or more tiles) and the tile boundary limitation can be ignored. Thus, the method of the invention effects the screen dot division so that the divided screen dots are made whole when the screen tiles are combined to form a complete halftone screen ("tiling the plane").

In addition to determining which pixels contained in a screen tile are assigned to each screen dot group, the method of the present invention also assigns a dither threshold value to each pixel contained in the screen tile. Dither threshold values are stored in the separate threshold array. In the illustrated embodiment, threshold values are effectively assigned to pixels based on the order in which a pixel is selected for inclusion in a screen dot.

Figure 9B:
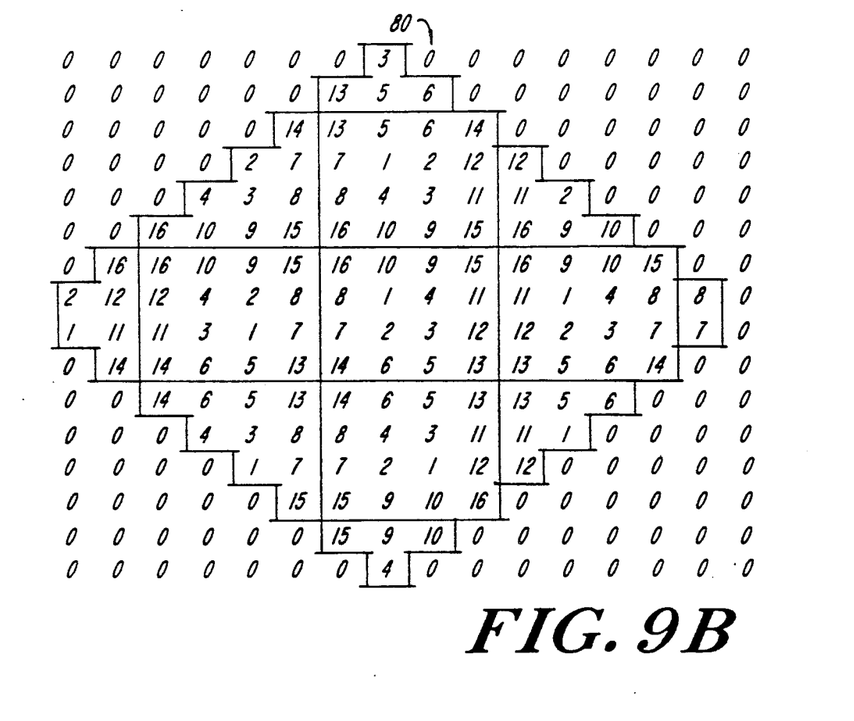

FIG. 9b shows a threshold array 80 generated according to one embodiment of the invention. The screen dot boundaries of threshold array 80 correspond to the boundaries identified in the mapping array 60 shown in FIG. 9a. Threshold values, in this illustrated embodiment, are indicated by the integers 1 through 16, and are stored as array elements.

Figure 10A:
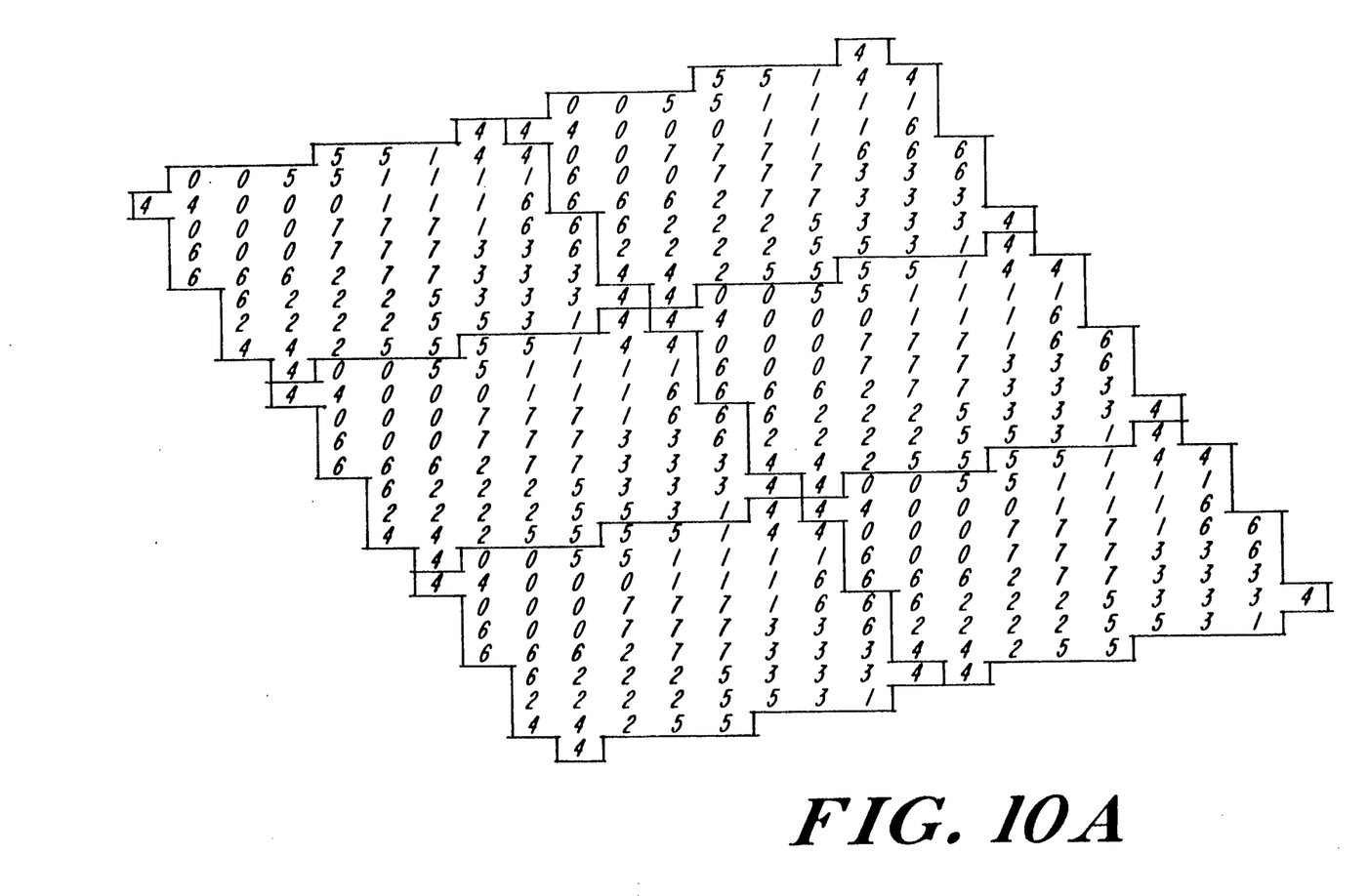
FIG. 10a is an example of a mapping array generated in accordance with the present invention for a screen tile approximating an angle of arctan $\frac{3}{8}$.
Figure 10B:
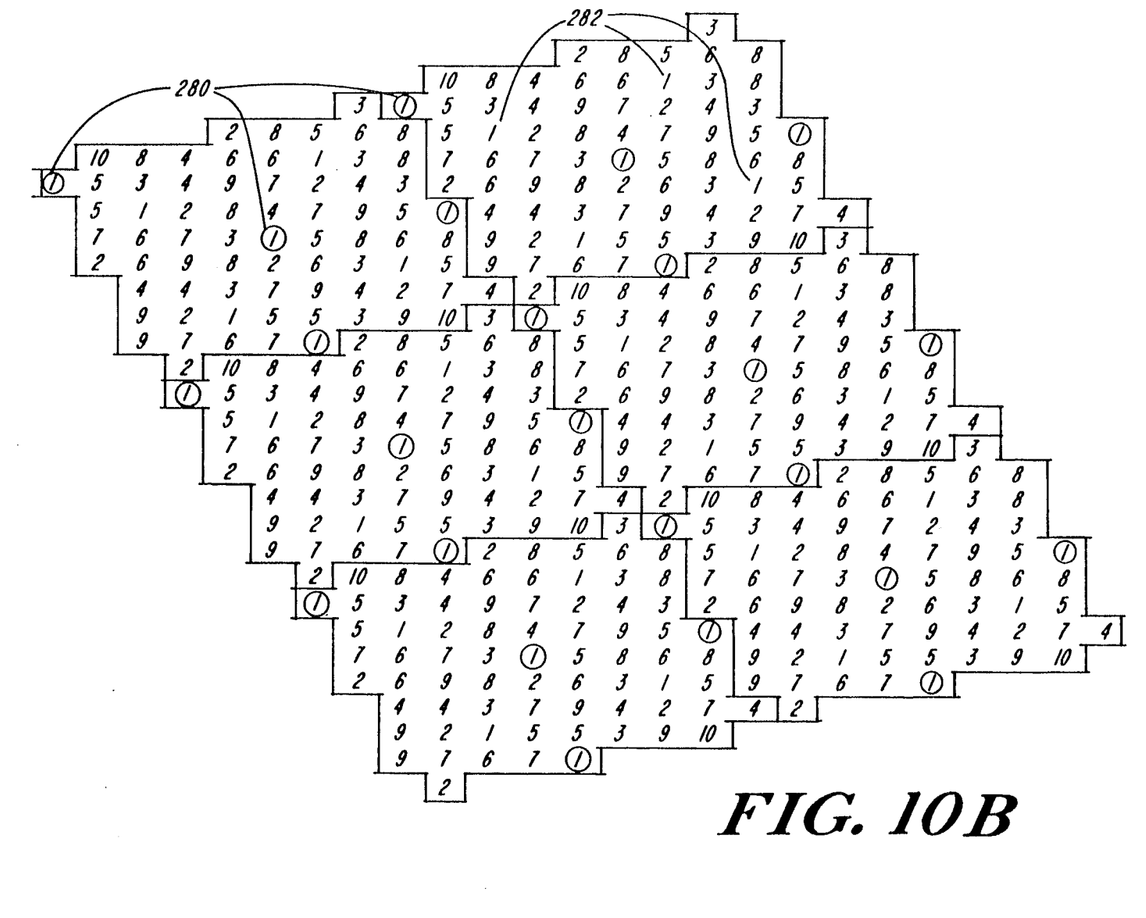

Referring to FIGS. 10a and 10b, a more complex example where $a=3$, $b=8$, and $N=2$ is illustrated. In this example, six tiles are fit together for the purpose of "tiling the plane".

Accordingly, the present invention provides a method for constructing halftone screen tiles which eliminates or at least reduces moire and low spatial frequency patterning.

Additions, deletions, and other modifications of the described embodiment will be apparent to those practiced in the art and are within the scope of the following claims.

What is claimed is:

1. A method for automatically generating a digital halftone screen at an angle to a Cartesian coordinate system used for scanning and recording, the screen being composed of a plurality of repetitive screen tiles, the screen having a desired screen pitch "p" and ideal screen angle "s", and each tile containing an integer number, "N", of screen dots along a side of the tile in a direction of screen pitch measurement, the method comprising the steps of
   selecting integers "a", "b", and "N" for providing a screen angle error, equal to the magnitude of ((arctan (a/b))−s), less than a selected threshold and yielding the desired screen pitch,
   automatically generating a screen tile boundary configuration in response to values of "a" and "b", automatically assigning each pixel within said tile boundary to be associated with a selected one of said screen dots, generating threshold data, in response to said assigning step, representing a screen signal threshold value for each pixel of the tile; and generating an angled halftone digital screen using said threshold data in said Cartesian coordinate system.

2. The method of claim 1 wherein said assigning step comprises the steps of selecting centers for each of the screen dots within the tile;

selecting pixels for approximating the center of each said screen dot;

selecting from available pixels within said tile boundary, for each dot, a best fitting pixel for assignment to each said screen dot and assigning said selected pixel to said screen dot; and repeating said available pixel selecting step until all pixels within the tile boundary have been assigned to said screen dots.

3. The method of claim 2 wherein said repeating step comprises the step of sequentially performing said available pixel selecting step for all pixels assigned to one screen dot before performing said available pixel selecting step for a next screen dot.

4. The method of claim 3 wherein said repeating step comprises the step of selecting a said pixel for a said screen dot and thereafter selecting a said pixel for a different screen dot, whereby all screen dots are grown at a substantially equivalent rate and size in parallel.

5. A method for automatically generating a digital halftone screen at an angle to a Cartesian coordinate system used for scanning and recording, the screen being composed of a plurality of repetitive screen tiles, the screen having a desired screen pitch "p" and ideal screen angle "s", and each tile containing an integer number, "N", of screen dots along a side of the tile in a direction of screen pitch measurement, the method comprising the steps of selecting integers "a", "b", and "N" for providing a screen angle error, equal to the magnitude of ((arctan (a/b))−s), less than a selected threshold and yielding the desired screen pitch, automatically generating a screen tile boundary configuration in response to values of "a" and "b", automatically assigning each pixel within said tile boundary to be associated with a selected one of said screen dots, storing said pixel associations in a mapping array, generating a threshold array in response to said assigning step having elements representing a screen signal threshold value for each pixel of the tile; and generating an angled halftone digital screen using said threshold array data in said Cartesian coordinate system.

6. The method of claim 5 wherein said assigning step comprises the steps of selecting centers for each of the screen dots within the tile;

initializing a candidate list for each screen dot for recording pixels available for inclusion in said each screen dot;

selecting pixels for approximating the center of each said screen dot;

adding to said candidate list of a said screen dot, pixels adjacent to said selected center pixel for said screen dot;

selecting, from the candidate list for each dot, a best fitting pixel for assignment to each said selected screen dot and assigning said selected pixel to said screen dot;

adding to said candidate list, pixels horizontally and vertically adjacent to a last selected pixel;

prioritizing each said candidate list; and repeating said pixel selecting and adding steps until all pixels within the tile have been assigned to said screen dots.

7. The method of claim 6 wherein said storing step comprises the steps of assigning, to each of said pixels contained in said screen tile, a screen dot identifier; and storing the screen dot identifier in said mapping array at a location corresponding to said pixel being selected.

8. The method of claim 7 wherein said threshold array generating step comprises the step of assigning threshold values in said threshold array for each pixel of a tile, said threshold values corresponding to screen signal dither threshold levels.

9. The method of claim 5 wherein said threshold array generating step further comprises the step of basing said screen signal threshold value for a selected pixel on an order in which said pixel was selected for inclusion in said screen dot, each succeeding pixel being assigned an incrementally different dither threshold value than a previously selected pixel.

10. The method of claim 2 wherein said available pixel selecting step comprises the step of selecting a pixel located nearest to a last chosen pixel if two or more pixel candidates have a same highest priority.

11. The method of claim 2 wherein said available pixel selecting step further, comprises the step of selecting a pixel minimizing an RMS error of a resulting dot with respect to an ideal dot model being employed if two or more pixel candidates have a same highest priority.

12. The method of claim 5 wherein said assigning step for pixel selection comprises the step of proceeding in parallel for all of the screen dots contained within the tile boundary.

13. The method of claim 2 wherein said available pixel selecting step further comprises the step of selecting the pixel which minimizes the error associated with aligning neighboring dots, if two or more pixel candidates have a same highest priority.

14. The method of claim 6 further wherein said assigning step comprises the step of choosing a next pixel on said list, if the pixel chosen from the candidate list has already been assigned to another screen dot, until either an unused pixel is chosen or the candidate list is exhausted.

15. The method of claim 5 further comprising the step of providing a tile having "N" screen dots along each side.

16. The method of claim 1 further comprising the step of receiving, from a data source, Cartesian coordinate data, and recording said Cartesian coordinate data on a recording medium using a scanning line moving at an angle to said ideal screen angle and using the threshold data.

17. The method of claim 1 further comprising the step of tiling a plane using said screen tile boundary configuration.

18. The method of claim 2 wherein the step of selecting from available pixels comprises the steps of determining how many exposed pixel edges result from adding a pixel to a said screen dot, and using said resulting exposed pixel edges in determining whether the pixel is a best fitting pixel.

* * * * *